US010678905B2

(12) United States Patent
Seethaler et al.

(10) Patent No.: US 10,678,905 B2
(45) Date of Patent: Jun. 9, 2020

(54) PROCESS FOR CONTROLLING BATTERY AUTHENTICATION

(75) Inventors: Kenneth Scott Seethaler, Wake Forest, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 533 days.

(21) Appl. No.: 13/051,009

(22) Filed: Mar. 18, 2011

(65) Prior Publication Data
US 2012/0239555 A1    Sep. 20, 2012

(51) Int. Cl.
| G06F 21/44 | (2013.01) |
| G06F 21/81 | (2013.01) |
| G06Q 50/04 | (2012.01) |
| H04L 9/32  | (2006.01) |

(52) U.S. Cl.
CPC .............. *G06F 21/44* (2013.01); *G06F 21/81* (2013.01); *G06Q 50/04* (2013.01); *H04L 9/3271* (2013.01)

(58) Field of Classification Search
CPC ...... H02J 2007/0001; H02J 2007/0098; G06F 21/44; G06F 21/81; G06Q 50/04; H04L 9/3271
USPC .................. 705/50, 55, 59; 713/16, 173, 176
See application file for complete search history.

(56) References Cited

U.S. PATENT DOCUMENTS

| 5,544,246 A | 8/1996 | Mandelbaum et al. |
| 5,633,573 A | 5/1997 | Van Phuoc et al. |
| 5,692,204 A | 11/1997 | Rawson et al. |
| 5,892,900 A * | 4/1999 | Ginter et al. ................ 726/26 |
| 5,905,486 A | 5/1999 | Brittenham et al. |
| 5,905,900 A | 5/1999 | Combs et al. |
| 6,189,108 B1 | 2/2001 | Cromer et al. |
| 6,291,966 B1 | 9/2001 | Wendelrup et al. |
| 6,975,092 B2 * | 12/2005 | Edington et al. ............ 320/106 |
| 7,424,740 B2 | 9/2008 | Bear et al. |
| 7,613,924 B2 * | 11/2009 | Shankar et al. ............. 713/168 |
| 7,617,395 B2 * | 11/2009 | Sasaki .................. H04L 9/3273 713/168 |
| 7,667,429 B2 * | 2/2010 | Little .......................... 320/106 |
| 7,683,571 B2 * | 3/2010 | Takamatsu ............ H02J 7/0004 320/106 |
| 7,779,220 B1 | 8/2010 | Pione |

(Continued)

FOREIGN PATENT DOCUMENTS

GB        2239567 A1    7/1991

OTHER PUBLICATIONS

Infineon, Origa SLE95050 Original Product Authentication and Brand Protection Solution, Version 1.50, Jun. 2009.

*Primary Examiner* — Steven S Kim
(74) *Attorney, Agent, or Firm* — Ference & Associates LLC (57) ABSTRACT

Improved handling of couplable device recognition tasks in an electronic device such as a cell phone, smart phone, computer system, recording device or others is facilitated. Recognition of a couplable device such as a battery so as to enable exchange of power between the device and the battery or other couplable device functionality is determined by a match between one of a plurality of digital strings stored in the device and the decrypted response to an encrypted challenge derived from the one of stored strings. Control is exercised over the distribution of the encryption elements which enable the improved handling of the tasks.

16 Claims, 4 Drawing Sheets

(56) References Cited

U.S. PATENT DOCUMENTS

| | | | |
|---|---|---|---|
| 7,877,815 B2 * | 1/2011 | Yoo | H01M 10/42 380/270 |
| 8,898,461 B2 * | 11/2014 | Seethaler | G06F 21/44 320/106 |
| 2001/0025225 A1 * | 9/2001 | Ota et al. | 702/84 |
| 2002/0009059 A1 | 1/2002 | Abutaleb et al. | |
| 2002/0012541 A1 * | 1/2002 | Takemoto et al. | 399/12 |
| 2002/0082891 A1 * | 6/2002 | McKay et al. | 705/8 |
| 2002/0107809 A1 * | 8/2002 | Biddle et al. | 705/59 |
| 2003/0088448 A1 * | 5/2003 | Tan | 705/7 |
| 2004/0006544 A1 * | 1/2004 | Gulett | 705/400 |
| 2004/0066278 A1 | 4/2004 | Hughes et al. | |
| 2004/0111304 A1 * | 6/2004 | Meka et al. | 705/7 |
| 2004/0157555 A1 * | 8/2004 | Richenstein et al. | 455/39 |
| 2005/0001589 A1 | 1/2005 | Edington et al. | |
| 2005/0010782 A1 * | 1/2005 | Ohkubo | 713/182 |
| 2005/0035738 A1 * | 2/2005 | Patino | H01M 10/42 320/106 |
| 2005/0108309 A1 * | 5/2005 | Tsuboka | G06F 21/445 708/250 |
| 2005/0138470 A1 | 6/2005 | Cromer et al. | |
| 2005/0254650 A1 | 11/2005 | Sakurai et al. | |
| 2006/0002383 A1 | 1/2006 | Jeong et al. | |
| 2006/0149673 A1 | 7/2006 | Delefevre | |
| 2006/0149966 A1 * | 7/2006 | Buskey et al. | 713/168 |
| 2006/0178170 A1 * | 8/2006 | Chung | H01M 10/42 455/572 |
| 2006/0204004 A1 | 9/2006 | Shankar et al. | |
| 2006/0230276 A1 * | 10/2006 | Nochta | 713/176 |
| 2006/0291660 A1 | 12/2006 | Gehrmann et al. | |
| 2007/0019349 A1 * | 1/2007 | Daio | G06K 19/07381 361/91.1 |
| 2007/0050627 A1 * | 3/2007 | Chiku | 713/176 |
| 2007/0123303 A1 | 5/2007 | Book et al. | |
| 2007/0123304 A1 | 5/2007 | Pattenden et al. | |
| 2007/0123316 A1 | 5/2007 | Little | |
| 2007/0145945 A1 | 6/2007 | McGinley et al. | |
| 2007/0189516 A1 | 8/2007 | Lee | |
| 2008/0024268 A1 * | 1/2008 | Wong | G06F 21/72 340/5.8 |
| 2008/0037779 A1 | 2/2008 | Seman et al. | |
| 2008/0057894 A1 | 3/2008 | Aleksic et al. | |
| 2008/0126815 A1 | 5/2008 | Cantwell et al. | |
| 2008/0141069 A1 | 6/2008 | Iwamura | |
| 2008/0256370 A1 | 10/2008 | Campbell et al. | |
| 2008/0263375 A1 | 10/2008 | Sundstrom et al. | |
| 2008/0307240 A1 | 12/2008 | Dahan et al. | |
| 2009/0204834 A1 | 8/2009 | Hendin et al. | |
| 2009/0259867 A1 | 10/2009 | Paniagua, Jr. et al. | |
| 2009/0271629 A1 | 10/2009 | Michaud | |
| 2010/0056228 A1 | 3/2010 | Brown et al. | |
| 2010/0082998 A1 | 4/2010 | Kohavi | |
| 2010/0250936 A1 | 9/2010 | Kusakawa et al. | |
| 2010/0268946 A1 | 10/2010 | Taylor | |
| 2011/0093714 A1 * | 4/2011 | Schaecher et al. | 713/176 |
| 2011/0138206 A1 | 6/2011 | Garcia-Tobin | |
| 2011/0145608 A1 | 6/2011 | Hwang et al. | |
| 2012/0239555 A1 | 9/2012 | Seethaler et al. | |
| 2013/0212390 A1 | 8/2013 | Du et al. | |

* cited by examiner

PROCESS FOR CONTROLLING BATTERY AUTHENTICATION

FIELD AND BACKGROUND INVENTION

Many electronic devices accommodate exchange of electrical power both with a line power source (supplied by an electrical utility) and with a supporting battery. Such devices include telephones such as cell phones and so-called smartphones, computer systems, recording devices and others known to persons of skill in the applicable arts. In the discussion which follows, the term electronic device is used as a generic identifier, while other more system specific identifiers are used in a non-limiting way for purposes of clarity only. For the manufacturers of such devices, it is important that the interaction of a device with a battery meet the original specifications in the design of the device. This is significant for purposes of safety (as an improper battery presents known hazards) as well as product performance and customer satisfaction.

Many battery manufacturers produce batteries which meet the physical interface requirement to be fitted to various electronic devices manufactured by others, as there is a significant aftermarket for such batteries. That is, such a device may be sold by a device manufacturer with a battery which meets design specifications and which may ultimately lose usefulness. In such an event, the user of the electronic device will seek a replacement battery, either from the device manufacturer or from an aftermarket battery supplier. In making such a choice, there is a risk that the replacement battery will not meet specifications or will present hazards if used.

Provision has been made heretofore for controlling device and battery interaction by having a "handshake" or recognition function which enables an electronic device to recognize an acceptable battery and enable exchange of electrical power with such a battery while blocking such an exchange with an unrecognized battery. The exchange of electrical power may be discharging the battery to power the device or charging the battery or both. It is common for electrical devices of the types here discussed to have provisions for battery discharge and charge control, as will be known to persons of skill in the applicable arts.

SUMMARY OF THE INVENTION

The technology here described facilitates improved handling of battery recognition tasks in an electronic device of the types described. As will be described more fully hereinafter, what is here contemplated are arrangements in which a plurality of specific batteries may be equally given recognition qualities by the electronic device to which they may be fitted. Control over battery authentication as here described enables a device manufacturer to assure that third party aftermarket batteries may be given recognition qualities. Other and further arrangements are described in the specification which follows.

BRIEF DESCRIPTION OF DRAWINGS

Some of the characteristics of the technology having been described, others will appear as the description proceeds, when taken in connection with the accompanying drawings, in which.

DETAILED DESCRIPTION OF INVENTION

While the present technology will be described more fully hereinafter with reference to the accompanying drawings, in which a preferred embodiment of the present technology is shown, it is to be understood at the outset of the description which follows that persons of skill in the appropriate arts may modify what is here described while still achieving the favorable results desired. Accordingly, the description which follows is to be understood as being a broad, teaching disclosure directed to persons of skill in the appropriate arts, and not as limiting upon the protection sought.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
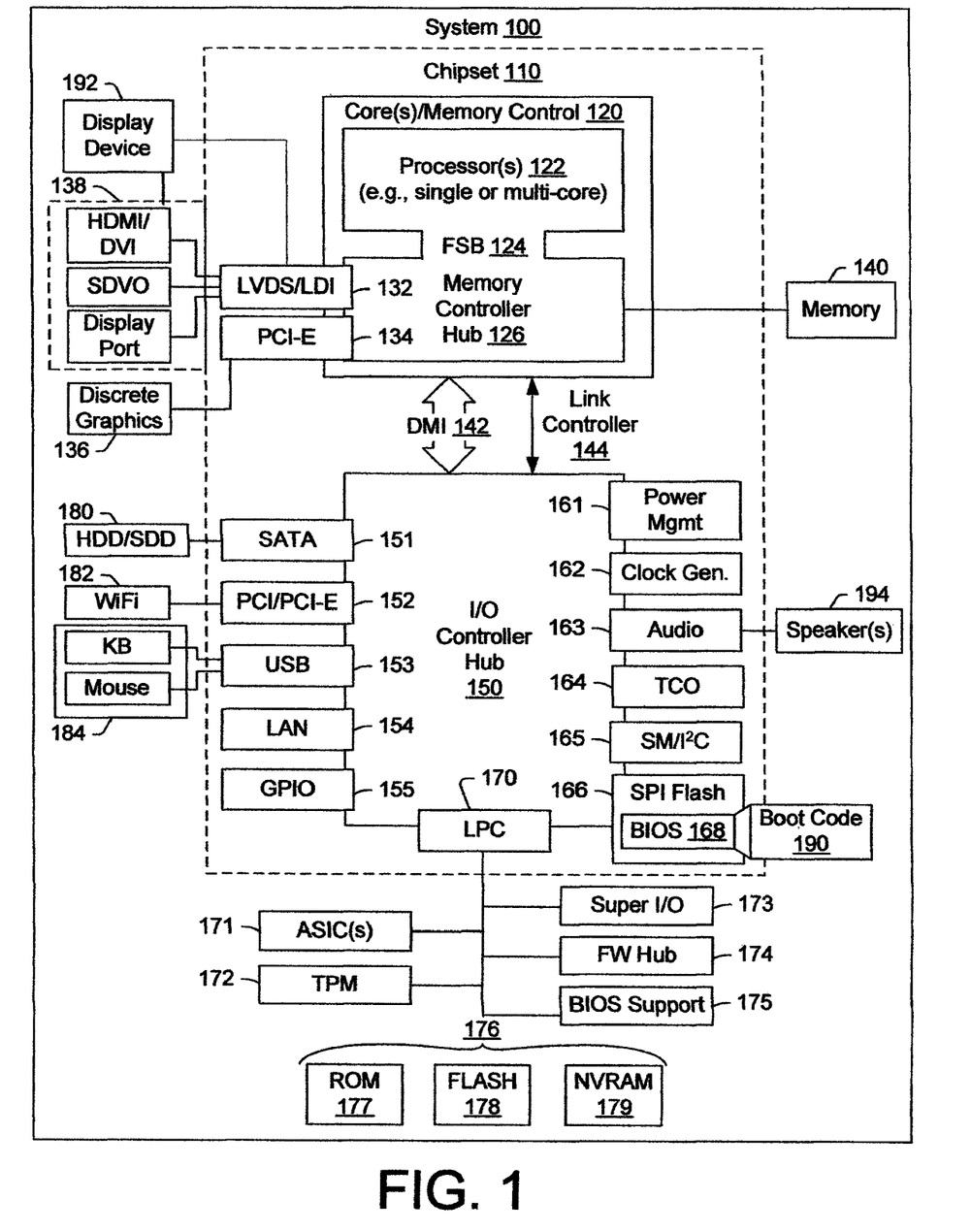
FIG. 1 is a illustration of an electronic device in the form of a computer system.

While various exemplary circuits or circuitry are discussed, FIG. 1 depicts a block diagram of an illustrative exemplary computer system 100. The system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 100. The computer system 100, when configured as a portable system of the types known as a notebook or netbook computer, will accommodate being powered either by a line voltage as derived from an electric utility or by a battery. Further, the system will exchange electrical power with the battery either by drawing power from the battery, charging the battery while connected to line voltage, or both.

The system 100 of FIG. 1 includes a so-called chipset 110 (a group of integrated circuits, or chips, that work together, chipsets) with an architecture that may vary depending on manufacturer (e.g., INTEL®, AMD®, etc.). The architecture of the chipset 110 includes a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (e.g., to provide support for a type of RAM that may be referred to as "system memory"). The memory controller hub 126 further includes a LVDS interface 132 for a display device 192 (e.g., a CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (e.g., for HDDs, SDDs, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. As described herein, a device may include fewer or more features than shown in the system 100 of FIG. 1.

It is known that a computer system as illustrated in FIG. 1 may support a plurality of states of power management through the power management interface 161. Such a system (or other electronic device) may have four states of power management: a normal operating state, a standby state, a hibernation state, and an off state. The standby state is characterized by devices, such as a video controller and a hard drive, being placed into a low-power mode transparent to the operating system and the applications executing on the computer system. The hibernation state is characterized by executing code being interrupted and the state of the computer system being saved to a file on the hard drive in such a manner that system power may be removed after the state of the computer system is saved to the hard drive. Later, after system power is restored, the state of the computer system is resumed by reading from the hard drive and loading it in such a manner that the operating system and application programs are not adversely affected. The normal operating state and the off state correspond to the typical on and off states of computer systems lacking such multiple state of power management. Transition from one state to another is variously controlled by passage of time or manipulation of manual switches or by remote actuation through a network adapter. In some known systems, the hibernation state is known as S3; hibernation as S4; and power off as S5. Transitions among the various power states can and will occur when the system is powered by line voltage and by a battery.

The technology which is the focus of this description contemplates operation of the computer system in accordance with a process in which the system accommodates line and battery power, has a first cryptographic element and stores a plurality of digitally encoded binary/hex or number strings. As will be made more clear hereinafter, these strings are stored within memory of the system accessible to the system processor and code stored in the system which manipulates the string in a particular manner. The technology anticipates the coupling to the computer system of a battery which has a second cryptographic element. While the battery is coupled, there is an exchange of encrypted messages derived from one of the strings between cooperating first and second cryptographic elements wherein a matched exchange enables the computer system to recognize the battery and exchange electrical power with the recognized battery.

It will be understood that a battery is only one type of device which may be coupled to an electronic device of the types addressed here. By way of examples only, where the electronic device is a computer system, then a variety of devices offered by various manufacturers may be coupled to the system, such as network interface cards, additional memory of various types, video driver cards and the like. Similar capabilities exist for other electronic devices as well. What is here described as an exchange of messages between cooperating first and second cryptographic elements may enable or disable (in the event of a failed match) functionality of such coupled devices. That is, to continue the example of a computer system and a network interface card, such the addition of such a card to the system result in a failed match (as here described) then the card would not be recognized by the computer system and interfacing to a network through the card blocked. Should the addition result in a matched exchange, then interfacing to a network would be enabled.

As used herein, the phrase "matched exchange" has a particular meaning. A matched exchange occurs when a binary/hex string originating from one of the system and the battery is transmitted to the other in an encrypted form, decrypted where received and returned for comparison to he original string. Such encryption is asymmetrical, using paired public and private keys. Public-key cryptography refers to a method for transforming a message, including a binary/hex or string, into a form that can be read only by an intended recipient. This cryptographic approach involves the use of asymmetric key algorithms. The non-message information (the public key) needed to transform the message to a secure form is different from the information needed to reverse the process (the private key).

Preferably, a public key is stored in the computer system and a private key is stored in a battery which can be coupled to the computer system, about which more will be said later. The plurality of strings stored in the computer system are encrypted using the public key and may be communicated to the battery as an encrypted string. The encrypted string is then decrypted in the battery using the private key and the unencrypted string returned to the system. If the returned number matches a string stored in the system, then a matched exchange has occurred and the battery is recognized. In the event that there is no returned string or the returned string does not match, then the matched exchange fails and the electronic device will block the exchange of power with the unrecognized battery. The electronic device responds to a transition from one power state to another power state by initiating an exchange of encrypted messages and selects from among a plurality of stored encrypted strings differing ones of the encrypted strings to be used in exchanges initiated on successive transitions from one power state to another power state.

Figure 2:
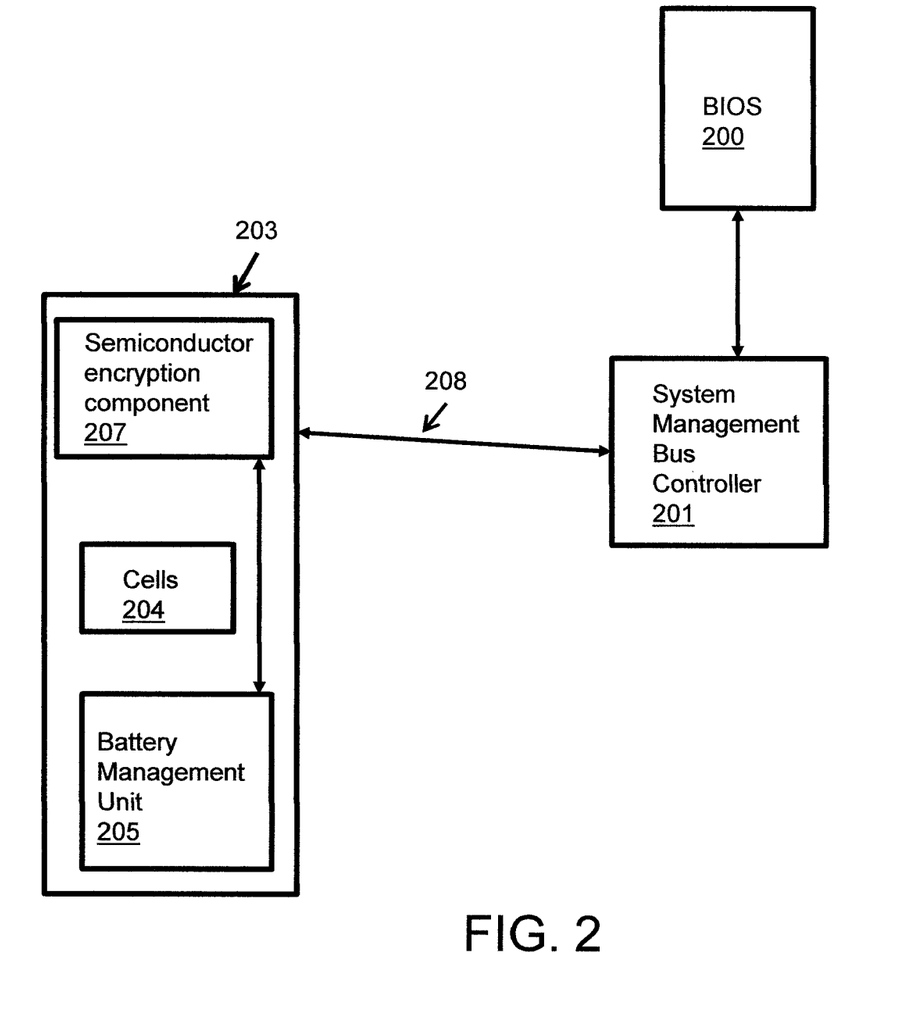
FIG. 2 is an illustration of the interconnections and interactions between an electronic device such as the computer system of FIG. 1 and a supporting battery.

Referring now to FIGS. 1 and 2, the drawings represent the elements involved in the exchange. A list of a plurality of digitally encoded binary/hex strings is maintained in or accessibly to the BIOS 200 which identify batteries to be recognized for the system. A public encryption key is also maintained. On each power state transition, each of the strings is encrypted using the public key to create a list of challenges (the encrypted strings) and responses (the original strings, as decrypted using the paired private key) and store the challenge/response strings accessibly to the system management bus controller 201. An encrypted string to be used as a challenge becomes a number used once, also known as a nonce. Because the strings are stored in the controller 201, the numbers are available for a challenge/response on any change of batteries in addition to power state transitions. The advantage of the cached numbers is that the controller 201 may manage new battery insertions while system operation continues. However, the nonce may be created "on the fly" as needed, should that be deemed preferable.

A battery 203 to be coupled to the system has cells 204, a battery management unit 205 and a semiconductor component 207 which stores the private key. When a challenge arrives at the battery, the semiconductor component supplies the private key used to decrypt the challenge. The challenge is communicated to the battery management unit 205 through the system management bus 208, the response (the decrypted original string) is generated using the private key stored in the semiconductor component 207, and returned through the bus 208.

In the event that the response matches the original string, the battery is recognized and enabled for power exchange, discharging, charging or both. In the event there is no response or the response fails to match the original string, the match fails, the battery is not recognized, and the exchange of power with the battery is blocked.

Figure 3:
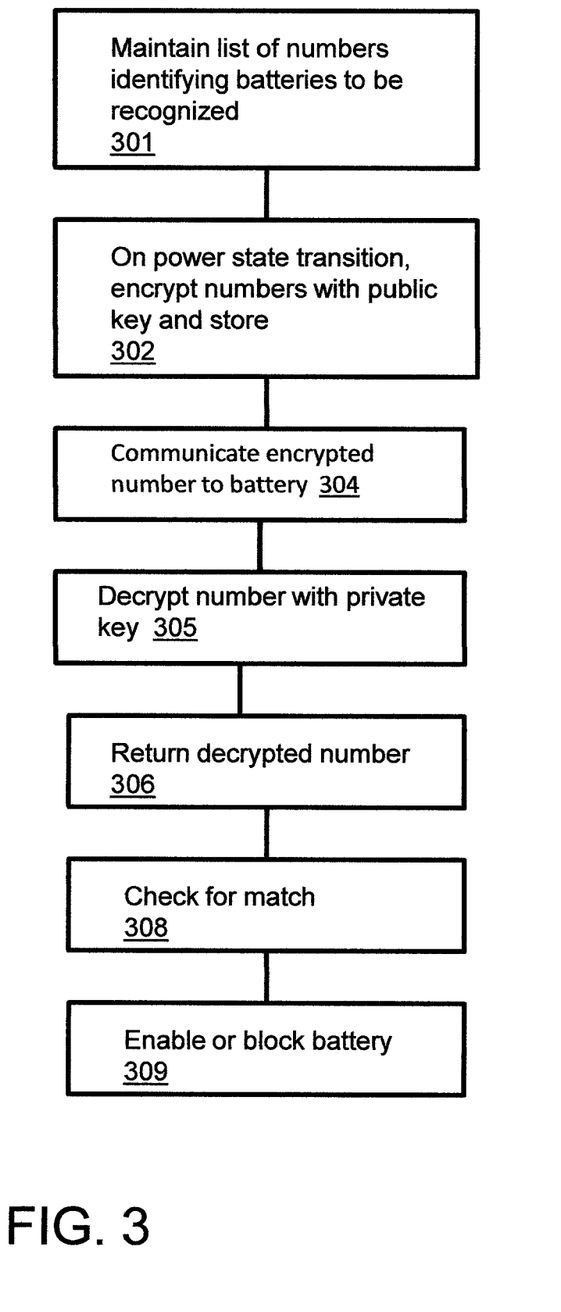
FIG. 3 is a flow chart representation of interactions between an electronic device such as the computer system of FIG. 1 and batteries supplied as original equipment with the device, supplied as after market authorized batteries; and supplied as after market unauthorized batteries.

The sequences are illustrated in FIG. 3. To restate, a list of strings identifying batteries to be recognized is maintained as at 301. On a power state transition, those numbers are encrypted with the public key at 302 and communicated to a battery at 304 (the "challenge"). This can occur, for example, should a battery be changed during operation of the system or should a second battery be coupled to a system which accommodates such connections or should a change be made at a docking station. At the battery, the encrypted number is decrypted using the private key at 305 and returned to the system (the "response") at 306. The system then checks for a match (308) and either enables or blocks the battery depending upon whether the match succeeds or fails (309).

In this process, the public key stored in the system functions as a first encryption element, with the private key stored in the semiconductor device 207 functions as a second encryption element. The first encryption element is exercised by code stored in the system accessibly to the processor and causing the processor when executing the code to perform the encryption and storing described.

Figure 4:
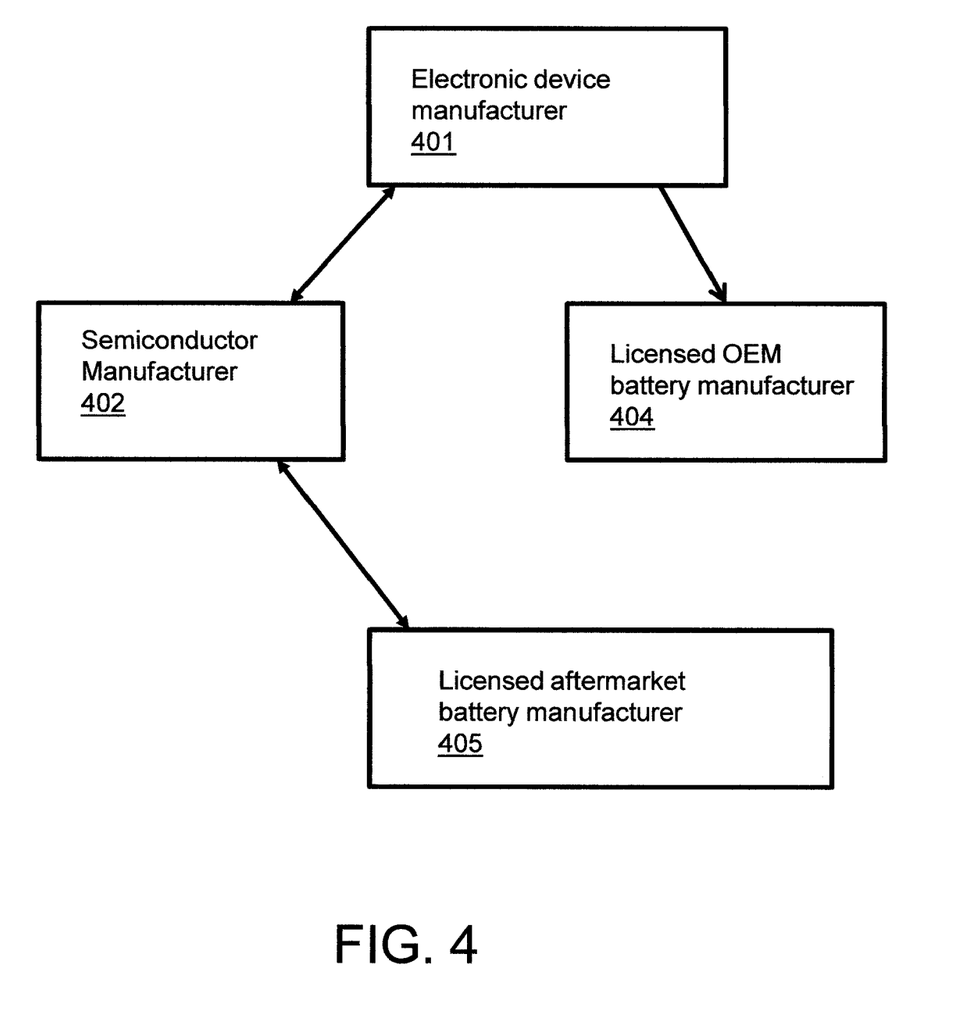
FIG. 4 is a representation of transactions among a number of parties engaged in the supply of electronic devices, batteries, and components therefor.

Referring now to FIG. 4, attention will now turn to the manner of controlling the distribution of the second cryptographic elements described above, particularly the semiconductor component to be incorporated into a battery. The semiconductor component may be supplied by a third party semiconductor manufacturer 402 which does not engage in either electronic device or battery manufacture, or may be supplied by the electronic device manufacturer. In any instance, the semiconductor component contains the private key and is paired to a public key which will be incorporated into the electronic device. Typically, such a semiconductor component is provided by the semiconductor manufacturer 402 in a number of differing models or types, each of which has a determined pairing of public and private keys known to the semiconductor manufacturer. Distribution of the keys is under the control of the electronic device manufacturer 401, which will have knowledge of the public keys and will not necessarily have knowledge of the private keys.

Batteries to be recognized are provided from a plurality of sources and in all instances incorporate one of the semiconductor components which will enter into the encryption/decryption/recognition process described above. As will be understood, batteries which lack the component which is particularly configured to enter into the recognition exchange will fail the matched exchange test. In accordance with what is here contemplated, distinctions are drawn among a plurality of models of the semiconductor components which have sets of public and private keys which differ one from another. Manufacturers are supplied with differing models of the semiconductor components. Manufacturers are charged differing prices for the semiconductor components depending upon whether the manufacturer produces the electronic devices or manufactures batteries for sale solely to an electronic device manufacturer (a licensed OEM manufacturer 404) or manufactures batteries for aftermarket sales (a licensed aftermarket manufacturer 405). It is contemplated that the lowest price would be charged to a electronic device manufacturer 401, enabling that manufacturer to pass on the semiconductor components to authorized battery manufacturers 404 producing for delivery of batteries with the electronic devices. A higher price would be charged by the semiconductor manufacturer to battery manufacturers 405 licensed by the electronic device manufacturer to make authorized aftermarket batteries, with a portion of that price being paid by the semiconductor manufacturer to the electronic device manufacturer as consideration for the license granted to the battery manufacturers 405.

As will be appreciated, the public/private key pairs instantiated in the semiconductor component and electronic device may be different for the components sold to the electronic device manufacturer 401 and the components sold to the authorized aftermarket battery manufacturers 405. Thus, licensed battery manufacturers 404, 405 are allowed access to selected models or types of the semiconductor components, by permitting controlled purchase from a third party semiconductor manufacturer 402 of the semiconductor component. This controlled purchase distinguishes between manufacturers producing batteries for a computer system manufacturer and manufacturers producing batteries for aftermarket sale apart from computer system sales. Unlicensed battery manufacturers are denied access to the semiconductor components.

In the drawings and specifications there has been set forth a preferred embodiment of the technology and, although specific terms are used, the description thus given uses terminology in a generic and descriptive sense only and not for purposes of limitation.

What is claimed is:
1. Method comprising:
incorporating a first cryptographic element into an electronic device, wherein the first cryptographic element comprises a plurality of digitally encoded strings accessible to the electronic device and a public encryption key;
providing second cryptographic elements to be incorporated into batteries couplable to the electronic device to suppliers of the couplable batteries, wherein the second cryptographic elements comprise a private key paired to the public encryption key, each of the second cryptographic elements cooperating with the first cryptographic element and enabling the exchange of encrypted messages between the first cryptographic element and one of the second cryptographic elements;

distinguishing among a plurality of models of the second cryptographic elements using keys which differ one from another;

supplying differing models of the second cryptographic elements to differing suppliers of couplable devices, wherein the supplying of differing models of the second cryptographic elements to differing suppliers comprises providing differing second cryptographic elements based on manufacturer type;

said first cryptographic element and one of the second cryptographic elements incorporated into a battery coupled to the electronic device exchanging encrypted messages in response to an initiation of the exchange based upon the electronic device transitioning from one power state to another power state, wherein said exchanging comprises, upon each power state transition, encrypting, by the electronic device, the plurality of digitally encoded strings using the public encryption key and creating a list of challenges comprising the encrypted plurality of digitally encoded strings and responses comprising the digitally encoded strings, communicating, by the electronic device, one of the challenges to the battery coupled to the electronic device, receiving, by the electronic device, one of the challenges to the battery coupled to the electronic device wherein the response from the battery coupled to the electronic device comprises a string that has been decrypted by the battery coupled to the electronic device using the challenge and the private key of the one of the second cryptographic elements incorporated into the battery, and checking, by the electronic device, for a match between the string received from the battery coupled to the electronic device and the created responses; and in response to a failure of a matched exchange between said first cryptographic element and said one of the second cryptographic elements, the electronic device blocking exchange of electrical power with the battery coupled to the electronic device.

2. Method according to claim 1 wherein the supplying of differing models of the second cryptographic elements to differing suppliers comprises licensing the differing suppliers of couplable devices to purchase the second cryptographic elements and transferring licensing fee payments to a party producing the electronic device.

3. Method according to claim 1 wherein the exchanging of encrypted messages is an asymmetric exchange of a challenge and response between paired keys and further comprising determining the matched exchange by the response returned to a challenge.

4. Method according to claim 1 wherein the incorporating the first cryptographic element into the electronic device further comprises configuring the electronic device to accommodate line and battery power and wherein the electronic device exchanges electrical power with a recognized battery on the occurrence of the matched exchange.

5. Method according to claim 1 wherein the providing the second cryptographic elements comprises producing semiconductor components which instantiate the one of the second cryptographic elements.

6. Method according to claim 5 wherein the supplying of differing models further comprises charging differing prices for the semiconductor components.

7. Method according to claim 1 further comprising producing semiconductor components which instantiate the one of the second cryptographic elements and wherein the electronic device is a computer system.

8. Method according to claim 7 further comprising licensing battery manufacturers and allowing access by licensed battery manufacturers to selected models of semiconductor components.

9. Method according to claim 8 wherein the allowing access comprises permitting controlled purchase of the semiconductor component from a semiconductor manufacturer.

10. Method according to claim 8 wherein the licensing of battery manufacturers distinguishes between battery manufacturers producing batteries for a computer system manufacturer and battery manufacturers producing batteries for sale apart from computer system sales.

11. Method according to claim 1 wherein the supplying differing models of the second cryptographic elements to differing suppliers of couplable batteries comprises:

production by a semiconductor manufacturer of a semiconductor component instantiating the one of the second cryptographic elements; and licensing battery manufacturers and providing the licensed battery manufacturers access to the semiconductor component enabling battery and electronic device cooperation;

the licensed battery manufacturers paying to the semiconductor manufacturer licensing fees which distinguish between battery manufacturers producing batteries for an electronic device manufacturer and battery manufacturers producing batteries for sale apart from computer system sales.

12. Method comprising:

producing first and second cryptographic elements, wherein the first cryptographic element comprises a plurality of digitally encoded strings and a public encryption key and wherein each of the second cryptographic elements comprises a private key paired to the public encryption key;

incorporating the first cryptographic element into one of the electronic devices which accommodate line and battery power, wherein the public encryption key and the plurality of digitally encoded strings are accessible to a corresponding electronic device;

distributing the second cryptographic elements to battery manufacturers;

first cryptographic element and said one of the second cryptographic elements exchanging encrypted messages upon coupling of a battery manufactured by one of the battery manufacturers into said one of the electronic devices wherein the one of the second cryptographic elements is incorporated into the battery manufactured by the one of the battery manufacturers, the exchanging occurring in response to a transition of the one of the electronic devices from one power state to another power state, wherein said exchanging comprises, upon each power state transition, encrypting, by the one of the electronic devices, the plurality of digitally encoded strings using the public encryption key and creating a list of challenges comprising the encrypted plurality of digitally encoded strings and responses comprising the digitally encoded strings, communicating, by the one of the electronic devices, one of the challenges to the battery coupled to the one of the electronic devices, receiving, by the one of the electronic devices, a response from the battery coupled to the one of the electronic devices wherein the response from the battery coupled to the one of the electronic devices comprises a string that has been decrypted by the battery coupled to the one of the electronic devices using the challenge and the private key of the one of the second cryptographic elements incorporated into the battery, and checking, by the one of the electronic devices, for a match between the string received from the battery coupled to the one of the electronic devices and the created responses; and in response to a failure of a matched exchange between said first cryptographic element and said one of the second cryptographic element, the one of the electronic devices blocking exchange of electrical power with the battery coupled to the one of the electronic devices;

wherein distributing the second cryptographic elements to battery manufacturers comprises providing differing second cryptographic elements based on manufacturer type.

13. Method according to claim 12 wherein the incorporating the first cryptographic element into the one of the electronic devices which accommodate line and battery power comprises configuring the one of the electronic devices such that a success of the matched exchange enables the one of the electronic devices to recognize a battery and exchange electrical power with the recognized battery.

14. Method according to claim 12 wherein the distributing the second cryptographic elements comprises producing semiconductor components which instantiate the one of the second cryptographic element.

15. Method according to claim 14 wherein the distributing the second cryptographic elements comprises distinguishing among a plurality of models of the semiconductor components which have sets of keys which differ one from another and supplying differing models of the semiconductor components to differing suppliers of batteries which incorporate one of the models of the semiconductor components and which couple to the one of the electronic devices.

16. Method according to claim 12 wherein the distributing comprises:

production by a semiconductor manufacturer of a semiconductor component embodying the one of the second cryptographic elements;

licensing of battery manufacturers by an electronic device manufacturer and providing licensed battery manufacturers access to the semiconductor component enabling battery and electronic device cooperation;

the licensed battery manufacturers paying to the semiconductor manufacturer licensing fees which distinguish between battery manufacturers producing batteries for an electronic device manufacturer and battery manufacturers producing batteries for sale apart from computer system sales; and transmittal of licensing fees to the electronic device manufacturer.

* * * * *